(12) United States Patent
Seve

(10) Patent No.: US 7,159,825 B2
(45) Date of Patent: Jan. 9, 2007

(54) PROCESS AND DEVICE FOR THE OPTIMIZATION OF THE DEFLECTION OF THE SPOILER FLAPS OF AN AIRCRAFT IN FLIGHT

(75) Inventor: Philippe Seve, Toulouse (FR)

(73) Assignee: Airbus France, Toulouse (FR)

( * ) Notice: Subject to any disclaimer, the term of this patent is extended or adjusted under 35 U.S.C. 154(b) by 124 days.

(21) Appl. No.: 11/062,700

(22) Filed: Feb. 23, 2005

(65) Prior Publication Data
US 2005/0242243 A1 Nov. 3, 2005

(30) Foreign Application Priority Data
Feb. 24, 2004 (FR) .................................. 04 01827

(51) Int. Cl.
*B64C 13/16* (2006.01)
(52) U.S. Cl. .................... 244/203; 244/216; 244/195
(58) Field of Classification Search ................ 244/194, 244/195, 196, 182, 216, 213, 203; 701/3–4; 340/966
See application file for complete search history.

(56) References Cited

U.S. PATENT DOCUMENTS

| 4,372,507 | A | | 2/1983 | Denniston | |
|---|---|---|---|---|---|
| 4,590,475 | A | * | 5/1986 | Brown | 701/3 |
| 4,829,220 | A | | 5/1989 | Fabre | |
| 5,036,469 | A | * | 7/1991 | Pelton | 701/4 |
| 5,337,982 | A | * | 8/1994 | Sherry | 244/195 |
| 5,908,176 | A | * | 6/1999 | Gilyard | 244/195 |
| 6,341,247 | B1 | * | 1/2002 | Hreha et al. | 701/3 |
| 6,443,399 | B1 | * | 9/2002 | Yount et al. | 244/196 |
| 6,561,463 | B1 | | 5/2003 | Yount et al. | |
| 6,643,568 | B1 | * | 11/2003 | Chatrenet et al. | 244/182 |
| 7,048,228 | B1 | * | 5/2006 | Vassberg et al. | 244/216 |

* cited by examiner

*Primary Examiner*—Galen Barefoot
(74) *Attorney, Agent, or Firm*—Stevens, Davis, Miller & Mosher, LLP

(57) ABSTRACT

A process and device for optimization of deflection of spoiler flaps of an aircraft in flight may, in real time, compute an incidence potential available to be consumed by the spoiler flaps without endangering the aircraft and deflect the spoiler flaps toward the instructed deployed position as a function of the incidence potential.

9 Claims, 4 Drawing Sheets

PROCESS AND DEVICE FOR THE OPTIMIZATION OF THE DEFLECTION OF THE SPOILER FLAPS OF AN AIRCRAFT IN FLIGHT

FIELD OF THE INVENTION

The present invention relates to a process and device for the optimization of the deflection of the spoiler flaps of an aircraft in flight.

BACKGROUND OF THE RELATED ART

It is known that modern aircraft, in particular civil transport planes, comprise movable spoiler flaps, also referred to as "air brakes". Such spoiler flaps constitute aerodynamic control surfaces and they are generally installed in the upper face of the wings, behind their box structure and in front of the trailing edge flaps on which their own trailing edges rest.

Under the action of means of actuation, for example hydraulic, electrical or mechanical rams, themselves controlled from a lever actuated by the pilot of the aircraft, said spoiler flaps can take:

either a retracted position, for which they are housed in the upper face of the corresponding wing while ensuring the aerodynamic continuity of said upper face;

or one or other of several deployed positions, for which they protrude with respect to the upper face of the corresponding wing, while being inclined with respect to said upper face.

Thus, in retracted position, said spoiler flaps blend into the aerodynamic profile of the upper face of the wings of the aircraft. On the other hand, for each of the deployed positions—each of which is associated with a specific function and is defined by a value of angle of deflection with respect to the corresponding upper face—said spoiler flaps cause a decrease in lift and an increase in drag whose amplitudes depend on said angle of deflection and on the surface area of said spoiler flaps and which may be used for various purposes such as:

reduction in the speed of the aircraft during the phases of landing and, possibly, of interruption of take-off;

reduction in the speed of the aircraft in flight or increase in the descent slope of said aircraft;

bearing down on the aircraft on the ground to improve braking during the phases of landing or of interruption of take-off;

in-flight control of the roll of the aircraft by acting asymmetrically on the spoiler flaps of the two wings;

generation of a yawing moment by asymmetric action on the spoiler flaps of the two wings helping to counter the effects of a fault with an engine during take-off; or aid in decreasing the fixed-end moment where the wing is built into the fuselage, at high load factors (maneuvers, gusts of wind) by modifying the distribution of the lift along the wings.

Thus, the functions performed by the spoiler flaps are varied.

However, since the deployment of said spoiler flaps causes a loss of lift, their use in flight is accompanied by a reduction in the flight domain of said aircraft. Specifically, if the pilot wishes to compensate at least in part for this loss of lift so as to maintain safety and flight comfort, he must either increase the incidence of the aircraft, or accelerate the latter. If the aircraft were flying at an incidence close to the maximum incidence, the pilot has no other choice than to accelerate. In this case, the deployment of the spoiler flaps is therefore accompanied by a reduction in the flight domain, as far as speeds are concerned. The same goes for the turning capability, that is to say maneuverability, of the aircraft. Specifically, a turn requires an increase in lift, and hence in the incidence, of an aircraft. Since the deployment of the spoiler flaps limits the available incidence, it simultaneously limits the maneuverability of the aircraft.

SUMMARY OF THE INVENTION

The object of the present invention is to remedy these drawbacks by automating the deflection of the spoiler flaps so as to optimize the trajectory of the aircraft regardless of the flight conditions, without restricting the flight domain.

For this purpose, according to the invention, the process for optimizing the deflection of the spoiler flaps of an aircraft in flight, each deployed position of said spoiler flaps being controlled by the pilot of said aircraft, is noteworthy in that, in real time:

an incidence potential liable to be consumed by said spoiler flaps without endangering said aircraft is computed; and said spoiler flaps are deflected, toward the instructed deployed position, as a function of said incidence potential.

Thus, according to the invention, the deflection of the spoiler flaps can be adapted to the flight conditions of the airplane.

Said incidence potential may be of the type $$A = \alpha prot - \alpha - m,$$

in which expression:

$\alpha$ is the current incidence of said aircraft;

$\alpha prot$ is a predetermined value of incidence, which is less than the stalling incidence of the aircraft and onward of which there come into action automatic piloting mechanisms preventing said current incidence from being able to increase while approaching said stalling incidence, and m is a safety margin with respect to $\alpha prot$.

Said margin m may be constant and, for example, equal to 2 or 3 degrees of incidence. On the other hand, it may be variable and, for example, be dependent on the angle of roll of the aircraft, on the vertical load factor of the latter and/or on the difference between the value $\alpha prot$ and the value $\alpha_o$ representing the incidence at zero lift.

For the implementation of the process in accordance with the present invention, the device comprising a member at the disposal of the pilot of said aircraft for controlling the means of actuation of the spoiler flaps by way of a control line, is noteworthy in that it moreover comprises:

means of computation receiving the measurement of flight parameters and computing said incidence potential A; and a slaving device which receives said incidence potential A and whose output is constituted by an element interposed in said control line.

In standard fashion, said member at the disposal of the pilot can control said spoiler flaps by fraction of their maximum deflection, that is to say that each deployed position corresponds to such a fraction.

Said element interposed in said control line may then be a multiplier or a limiter controlled by said member at the disposal of the pilot.

In an advantageous embodiment, said slaving device comprises:
- a first amplifier, whose input is connected to said control line and whose gain is equal to the ratio $d\alpha/B_{max}$, in which $d\alpha$ is the decrease in the aircraft's incidence $\alpha$ caused by the maximum deflection $B_{max}$ of the spoiler flaps;
- an adder whose two inputs receive, respectively, said incidence potential A from said means of computation and the output signal from said first amplifier; and
- a second amplifier, with gain 1/K, connecting the output of said adder to said output element.

BRIEF DESCRIPTION OF THE DRAWINGS

The figures of the appended drawing will elucidate the manner in which the invention may be embodied. In these figures, identical references designate similar elements.

DETAILED DESCRIPTION OF THE DRAWINGS

Figure 1:
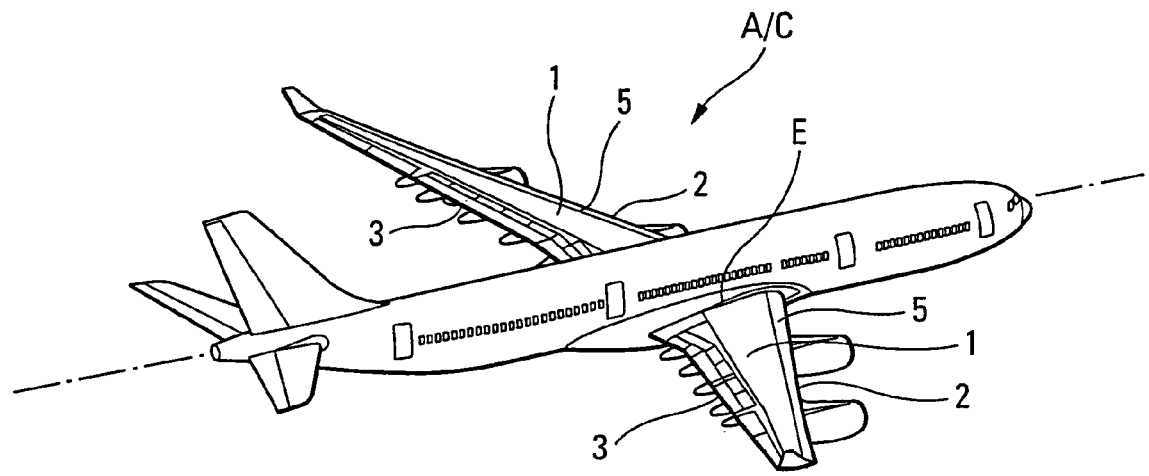
FIG. 1 shows, in flight and in perspective from above, a wide-bodied civil airplane.

The wide-bodied civil airplane A/C represented in FIG. 1 comprises two wings 1.

Figure 2:
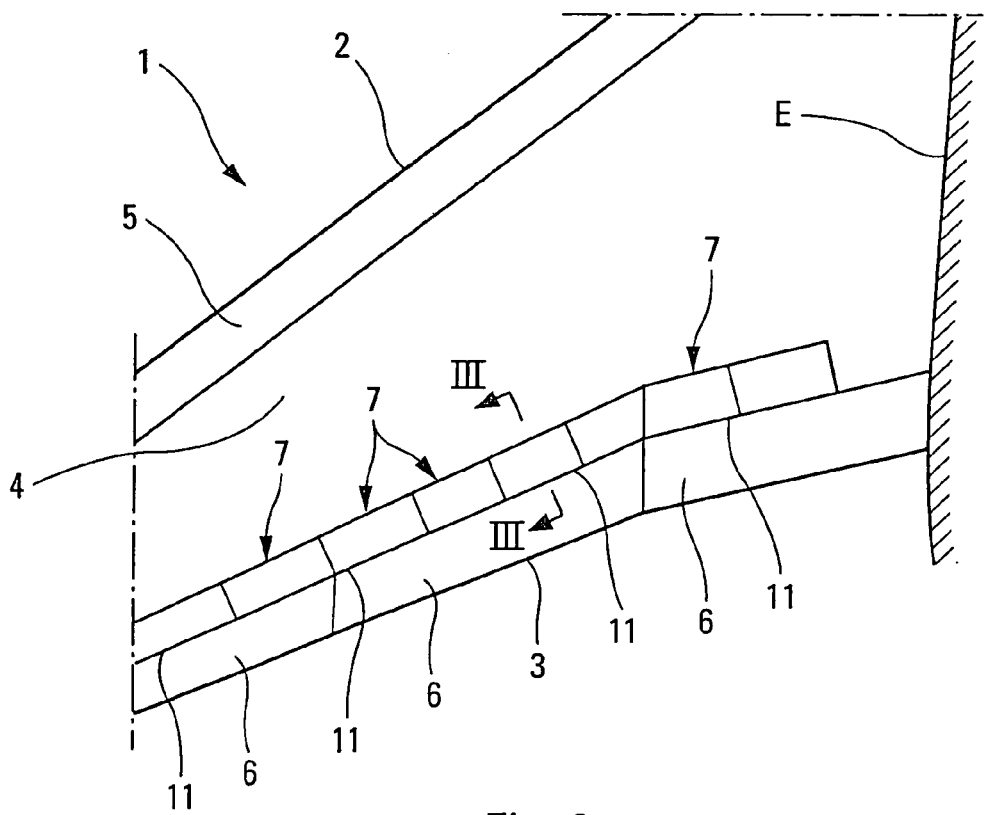
FIG. 2 shows, in a partial diagrammatic view from above, on a larger scale, a wing of the airplane of FIG. 1 together with its spoiler flaps, its leading edge slats and its trailing edge flaps in the retracted position.

As shown on a larger scale in FIG. 2, each wing 1 comprises a leading edge 2, a trailing edge 3, an upper face 4 and a root E.

The leading edge 2 is formed by at least one lift-enhancing slat 5.

The trailing edge 3 of the wing 1 is formed by the juxtaposition of the trailing edges of a plurality of adjacent trailing edge flaps 6.

In the upper face 4, upstream of the trailing edge flaps 6 (with respect to the aerodynamic flow over the wing 1), are disposed a plurality of spoiler flaps 7 whose plan form is that of a rectangle or a right-angled trapezium.

Figure 3:
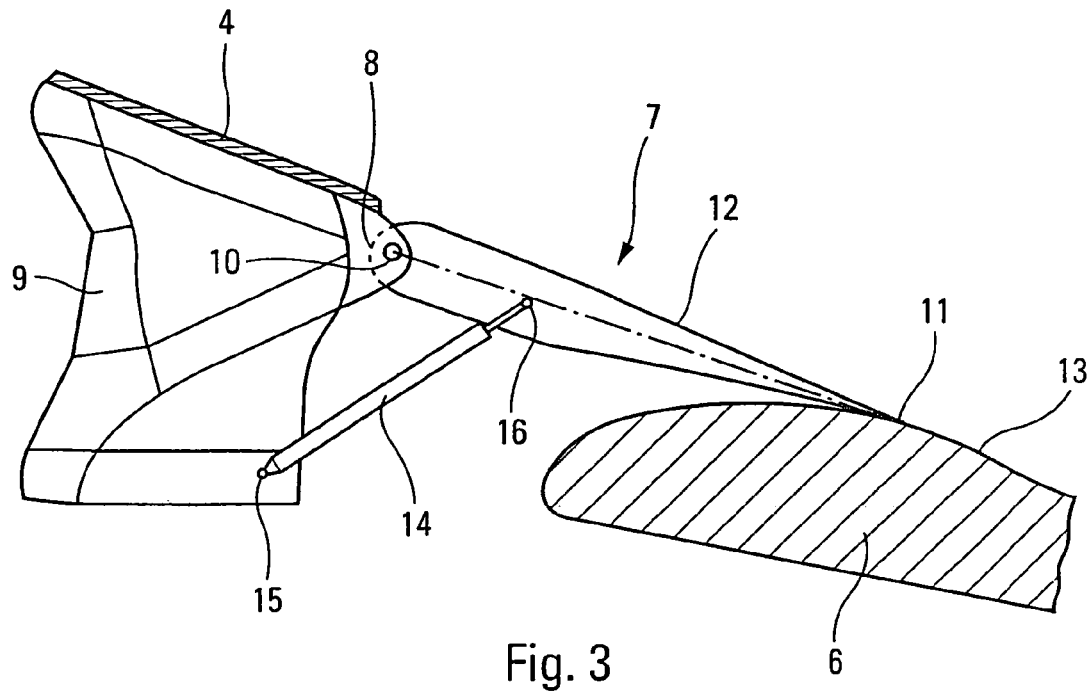
FIG. 3 is a partial and enlarged diagrammatic sectional view along the line III—III of FIG. 2.

As shown by FIG. 3, each spoiler flap 7 is articulated, on its leading edge 8 side, to the structure 9 of the wing 1 about an axis 10, parallel to said leading edge 8.

In the retracted position represented in FIGS. 2 and 3, the trailing edge 11 of each spoiler flap 7 bears on a trailing edge flap 6 and the upper face 12 of the spoiler flap 7 ensures aerodynamic continuity between the upper face 4 of the wing 1 and the upper face 13 of the flap 6.

Moreover, each spoiler flap 7 is connected to the structure 9 of the wing 1 by an inclined strut constituted by a ram 14, whose ends 15 and 16 are respectively articulated to said structure 9 and to said spoiler flap 7.

In the retracted position of the spoiler flap 7 (FIGS. 2 and 3), the ram 14 exerts a force so as to keep the latter in the retracted position.

When the ram 14 is activated to lengthen, the spoiler flap 7 pivots progressively about the axis 10 while it is deploying. As is shown in FIG. 4, for a deployed position corresponding to an angle of deflection B, the spoiler flap 7 makes it possible to decrease the lift and to increase the drag of the wing 1 in proportion to the value of said angle of deflection B.

Figure 4:
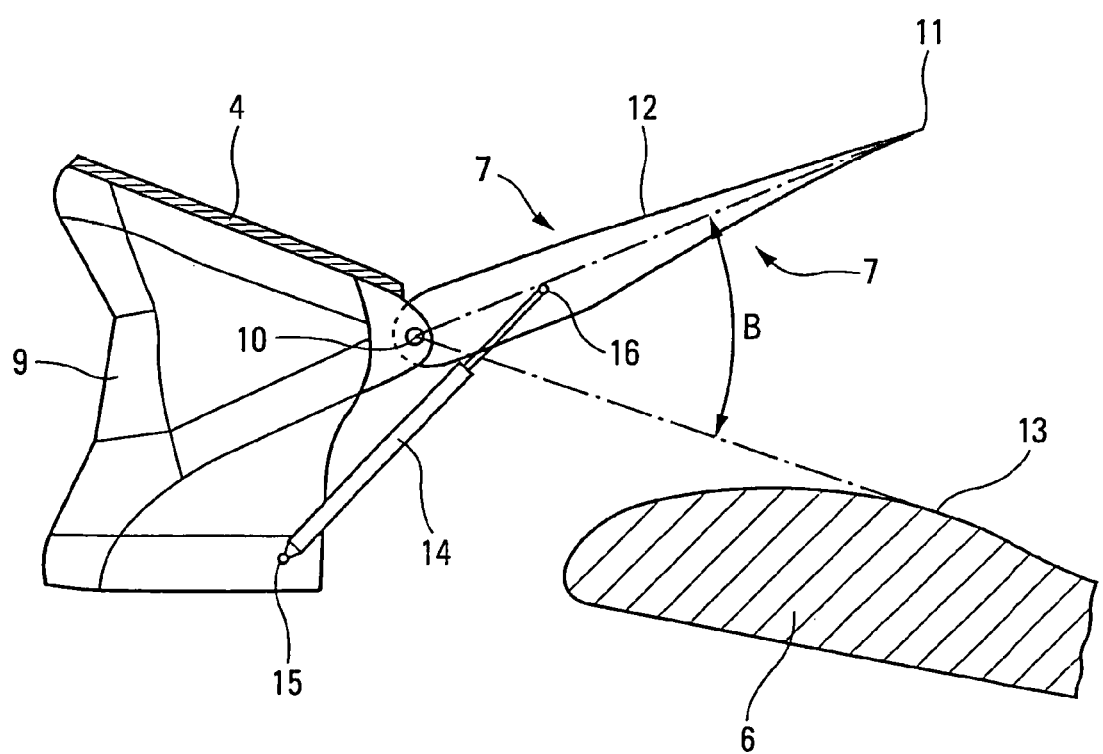
FIG. 4 shows, in a view similar to FIG. 3, a spoiler flap in a deployed position.

Of course, although in FIG. 4 only a single deployed position corresponding to a value of the angle of deflection B has been represented, it goes without saying that the spoiler flap 7 can occupy one or more other deployed positions, corresponding to other values of this angle.

Figure 5:
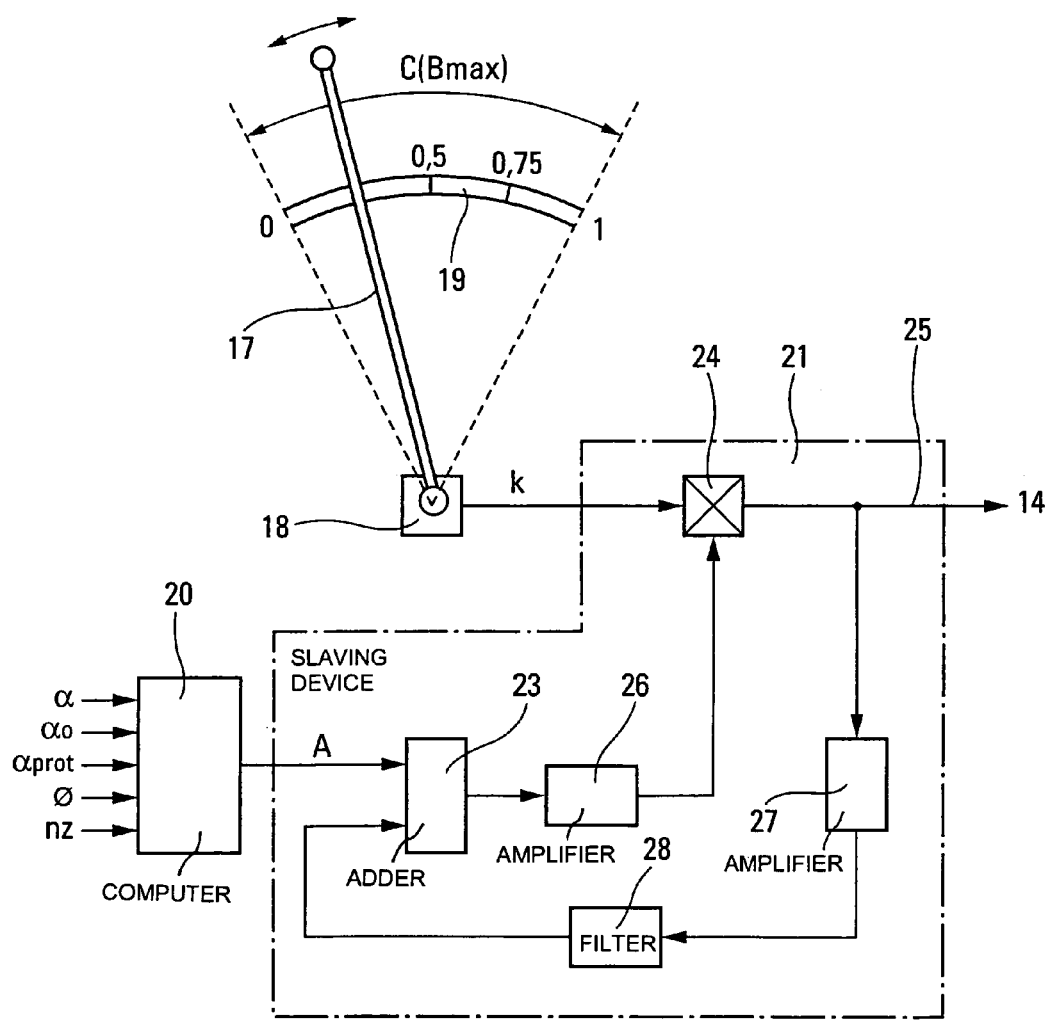
FIG. 5 gives the schematic diagram of a device, in accordance with the present invention, for the optimization of the deflection of the spoiler flaps of the airplane of FIG. 1.

As is diagrammatically illustrated by FIG. 5, the deployment and the retraction of the spoiler flaps 7 are controlled by a pivoting lever 17, at the disposal of the pilot, associated with a transducer 18 transforming the rotation of said lever 17 into a proportional order for actuating the rams 14. The total travel C of the lever 17 corresponds to the maximum value $B_{max}$, that can be taken by the angle of deflection B of the spoiler flaps 7.

In standard fashion, the rotation of the lever 17 is not graduated as a value of angle of deflection B, but as a fraction ($kB_{max}$) of the maximum value $B_{max}$ of deployment of the spoiler flaps 7 (with $0 \leq k \leq 1$).

Represented in FIG. 5 is a scale 19 of rotation of the lever 17, which bears the values 0–0.5–0.75 and 1 of k. In this figure, the lever 17 is represented in the position corresponding to 0.25 $B_{max}$.

The device, represented in FIG. 5, for controlling the deflection of the spoiler flaps 7 comprises, in addition to the lever 17 and to the transducer 18, a computer 20 and a slaving device 21.

In accordance with the present invention, the computer 20 computes in real time an incidence potential A and, as a function of the value and of the sign of this incidence potential A, the slaving device 21 increases or decreases the angle of deflection B controlled from the lever 17. The angle of deflection B is optimal when the value of the incidence potential A is zero.

Figure 6:
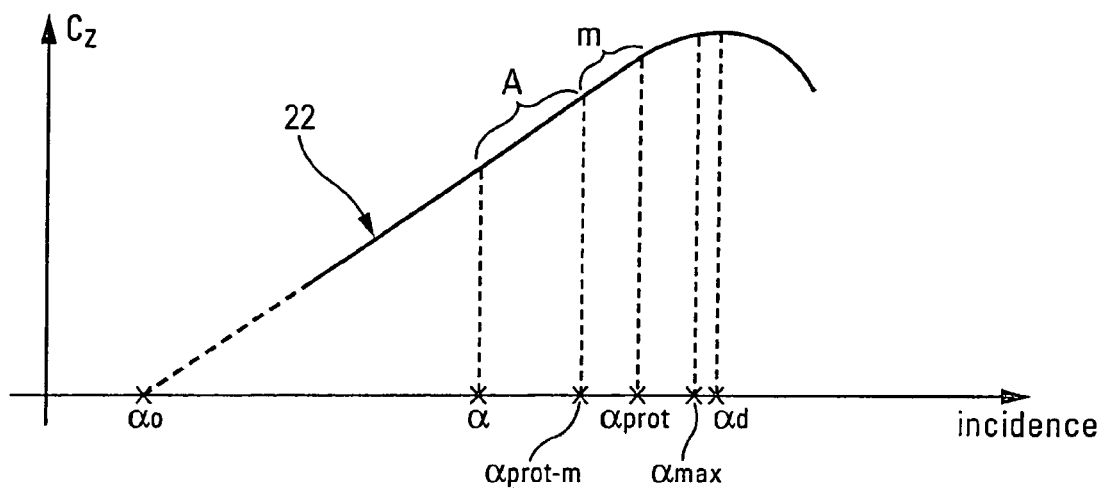
FIG. 6 is a chart illustrating, for a configuration of said airplane, the variation in the lift of said airplane as a function of its incidence.

To make the manner of operation of the device in accordance with the present invention more concrete, it is possible to refer to FIG. 6 which represents, for a given configuration of the slats 5 and of the flaps 6, the variation in the lift of the aircraft (in the form of the coefficient of lift Cz) as a function of the incidence of the airplane A/C. Such a variation is represented by a curve 22, the shape of which is well known to aerodynamicists. In the chart of FIG. 6 are indicated:
- the value of incidence $\alpha d$, at which, for the corresponding configuration of the slats 5 and of the flaps 6, the airplane A/C stalls;
- the value of incidence $\alpha max$, less than $\alpha d$, at which the flight computers of the airplane A/C take over total control of the latter so as to impose a safe configuration thereon;
- the value of incidence $\alpha prot$, less than $\alpha max$, at which the pilot begins to lose his authority over the spoiler flaps 7, said flight computers progressively taking control of the aircraft A/C so as to ensure that the latter does not take a dangerous configuration;
- the value of incidence $\alpha 0$ corresponding to zero lift.

The computer 20 receives, among other parameters, the value $\alpha$ of the current incidence of the airplane A/C, measured in standard fashion by at least one incidence probe (not represented) mounted on board the airplane A/C, as well as the value αprot, defined hereinabove, tabulated as a function of the Mach number and of the configuration of the slats 5 and of the flaps 7.

On the basis of α and αprot, the computer 20 computes the incidence potential A equal to αprot−α−m, m being a safety margin (see FIG. 6).

The margin m may be constant and equal, for example, to 2 or 3 degrees of incidence. In this case, the constant margin m is introduced into the memory of the computer 20.

On the other hand, the margin m may be more realistic and be rendered dependent on a certain number of parameters such as the incidence $α_0$ at zero lift (defined hereinabove and tabulated in a similar manner to αprot), the angle of roll $Φ$ of the airplane A/C when turning, or else the vertical load factor nz. In this case, these parameters are introduced into the computer 20, as is illustrated in FIG. 5, the angle of roll $Φ$ and the load factor nz being measured in standard fashion on board the airplane A/C.

By way of example of variable margin m may be cited the following expressions:

$m=[1−\cos(20°)]×[αprot−α_0]$, particularly suited to the case of a turning of the airplane A/C with an angle of tilt $Φ$ equal to 200, this being standard. However, such a margin has the drawback of remaining constant throughout the duration of the turn, thus bringing about a reduction in the deflection of the spoiler flaps;

$m=[\cos(Φ)−\cos(20°)]×[αprot−α_0]$, roll compensated so that when the airplane A/C tilts, the margin m decreases, making it possible to perform turns without retracting the spoiler flaps;

$m=[1/nz−\cos(20°)]×[αprot−α_0]$, making it possible to add a resource compensation to the roll compensation (for $Φ=20°$);

or any combination of the above expressions:

it is possible, for example, to define a margin m roll compensated up to a certain value of the angle $Φ$, then a constant margin beyond, this making it possible to leave the spoiler flaps 7 deployed for small turns and to start to retract them during turns requiring a large incidence.

Regardless of the expression, constant or variable, for the margin m, the incidence value A=αprot−α−m constitutes the current incidence potential which may be consumed, in full safety, by the spoiler flaps 7, that is to say it is possible to increase the angle of deflection B of said spoiler flaps 7 until the incidence potential A is zeroed by this deployment.

If the incidence potential A were negative, this would imply that the angle of deflection B of the flaps 7 is too large and that it is necessary to reduce it.

In the exemplary embodiment of the slaving device 21 represented in FIG. 5, there is provided an adder 23 for receiving, on one of its inputs, the incidence potential A, computed by the computer 20. This slaving device 21 furthermore comprises:

a multiplier 24, disposed in the line 25 connecting the transducer 18 to the rams 14;

an amplifier 26, with gain 1/K, connecting the output of the adder 23 to the multiplier 24, the factor K being equal to the ratio $dα/B_{max}$ in which dα is the increase in the incidence α of the airplane A/C caused by the maximum deflection $B_{max}$ of the spoiler flaps;

an amplifier 27, with gain K, receiving the instructed deflection signal conveyed by the line 25 and addressing it with amplification by the gain K and filtering by the filter 28 to the other input of the adder 23.

Thus, when the pilot of the airplane A/C actuates the lever 17, the instructed deflection of the spoiler flaps 7 is detected by the amplifier 27, which transforms this instructed deflection into a corresponding incidence quantity $Δα$. After filtering by the filter 28, this incidence quantity $Δα$, which is an estimate of the incidence currently consumed by the air brakes, is added to the incidence potential A in the adder 23. On output from the latter, it is therefore a real-time estimate of the incidence quantity available to be consumed by the spoiler flaps 7, which is transmitted to the amplifier 26. The latter then transforms this estimate of available incidence into a real-time estimate of the quantity of angle of deflection available for the spoiler flaps 7.

Thus, upon a request for deflection of the spoiler flaps 7 by the pilot, the slaving device 21 evaluates the exact order of deflection corresponding to the consumption of the available incidence potential A. In tandem with the deflection of the spoiler flaps 7, this order is corrected as a function of the reaction of the airplane (measured by the computer 20) so as ultimately to exactly attain the instructed deflection.

In the steady state, that is to say a constant instructed deflection and constant parameters at the input of the computer 20, the incidence potential A is zero, showing that a deflection instruction has been attained.

The manner of operation of the slaving device 21 is adjusted in such a way that the control of the spoiler flaps 7 that it instructs is neither too slow, nor too fast. Its response time may be of the order of a few seconds, for example 5 s, so as not to adversely affect the proper operation of the piloting laws, that are faster.

It will be remarked that, should certain spoiler flaps develop a fault, the present invention automatically adapts the deflection of the spoiler flaps that are still operational so as to tend to attain the instructed objective.

Figure 7:
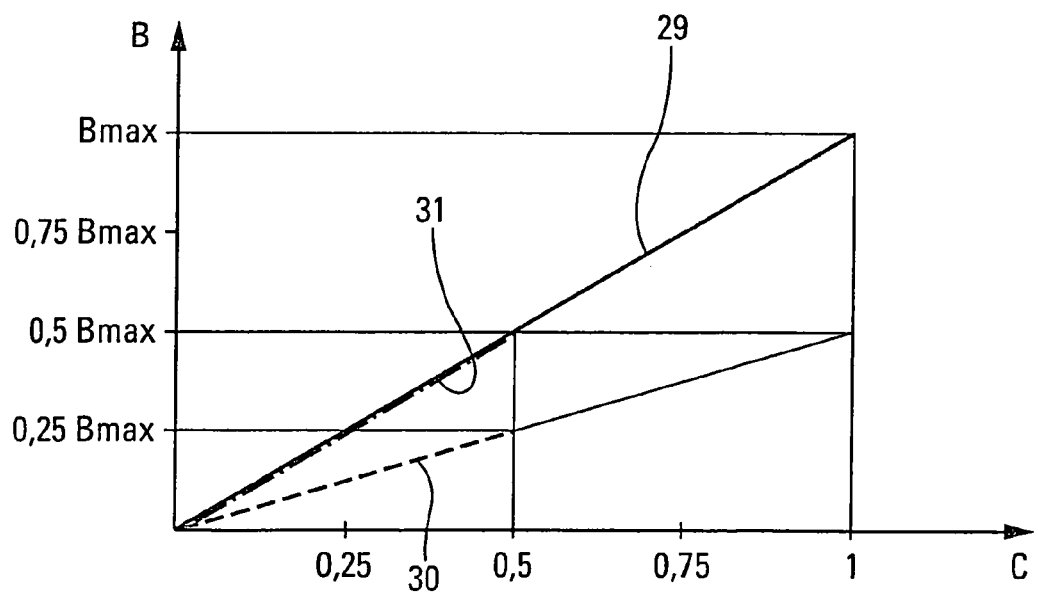
FIG. 7 is a chart illustrating the manner of operation of the device in accordance with the present invention.

As is represented in FIG. 7, if the pilot instructs the maximum deflection of the spoiler flaps 7 (the lever 17 is in the position 1 of the scale 19), the deflection B of said spoiler flaps is performed linearly along a line 29. If on the other hand the lever 17 is, for example, brought to the position 0.5 of the scale 19, the deflection of the spoiler flaps 7 will be performed proportionately so as to attain 0.25 $B_{max}$ (dashed curve 30).

If one wishes to obtain, for example, a deflection of 0.5 $B_{max}$ for the position 0.5 of the lever 17, the multiplier 24 can be replaced with a limiter controlled by the position of said lever 17. It will thus be possible to obtain a control instruction such as that represented by the chain-dotted line 31 in FIG. 7, partly coincident with FIG. 29.

Thus, from the foregoing it is noted that the present invention makes it possible to adapt the deflection of the spoiler flaps 7 to the flight conditions of the airplane, whereas, in the prior art, a preset deflection which restricts the flight domain of the airplane is adopted.

By virtue of the present invention:
the pilot can continue to fly at the present speed and maneuver without further restriction, the deflection of the spoiler flaps adapting automatically to his piloting. Hitherto, the extending of the spoiler flaps sometimes forced him to accelerate (this being paradoxical when extending aerodynamic surfaces which brake) or overly limited his angle of turn;

the airplane can search for the best angle of descent for each speed. In certain airplanes, the biggest angle of descent is not necessarily associated with the largest speed (in contradistinction to the descent speed); and the airplane can employ more extensive deflections for the spoiler flaps, these deflections no longer being limited by the choice of the airplane manufacturer of a global compromise between descent capability and the flight domain of the airplane. The descent capability will thereby be enhanced.

The invention claimed is:

1. A process for optimizing the deflection of the spoiler flaps of an aircraft in flight, each deployed position of said spoiler flaps being controlled by the pilot of said aircraft, wherein, in real time:

computing an incidence potential liable to be consumed by said spoiler flaps without endangering said aircraft; and deflecting said spoiler flaps, toward the instructed deployed position, as a function of said incidence potential, wherein:

said incidence potential is of the type $A=\alpha prot - \alpha - m$, in which expression:

$\alpha$ is the current incidence of said aircraft, $\alpha prot$ is a predetermined value of incidence, which is less than the stalling incidence of the aircraft and onward of which there come into action automatic piloting mechanisms preventing said current incidence from being able to increase while approaching said stalling incidence, and m is a safety margin with respect to $\alpha prot$.

2. The process as claimed in claim 1, wherein said margin m is constant.

3. The process as claimed in claim 2, wherein said constant margin is of the order of 2 or 3 degrees of incidence.

4. The process as claimed in claim 1, wherein said margin m is dependent on the angle of roll of said aircraft.

5. The process as claimed in claim 1, wherein said margin m is dependent on the vertical load factor of said aircraft.

6. A device for the implementation of the process as claimed in claim 1, comprising a member at the disposal of the pilot of said aircraft for controlling actuation of the spoiler flaps by way of a control line, said device comprising:

a computer that receives the measurement of flight parameters and computes said incidence potential; and a slaving device which receives said incidence potential and whose output is constituted by an element interposed in said control line.

7. The device as claimed in claim 6, in which said member controls said spoiler flaps by fraction of the maximum deflection$_{max}$ of said spoiler flaps, wherein said element is a multiplier.

8. The device as claimed in claim 6, in which said member controls said spoiler flaps by fraction of the maximum deflection$_{max}$ of said spoiler flaps, wherein said element is a limiter controlled by said member.

9. The device as claimed in claim 6, wherein said slaving device comprises:

a first amplifier whose input is connected to said control line and whose gain K is equal to the ratio $d\alpha/B_{max}$, in which $d\alpha$ is the decrease in the aircraft's incidence a caused by the maximum deflection $B\alpha$ of the spoiler flaps;

an adder whose two inputs receive, respectively, said incidence potential from said computer and the output signal from said first amplifier; and a second amplifier with gain 1/K, connecting the output of said adder to said output element.

* * * * *